April 10, 1962  S. R. J. STOKVIS  3,029,086
DOLLY
Filed June 25, 1959  2 Sheets-Sheet 1
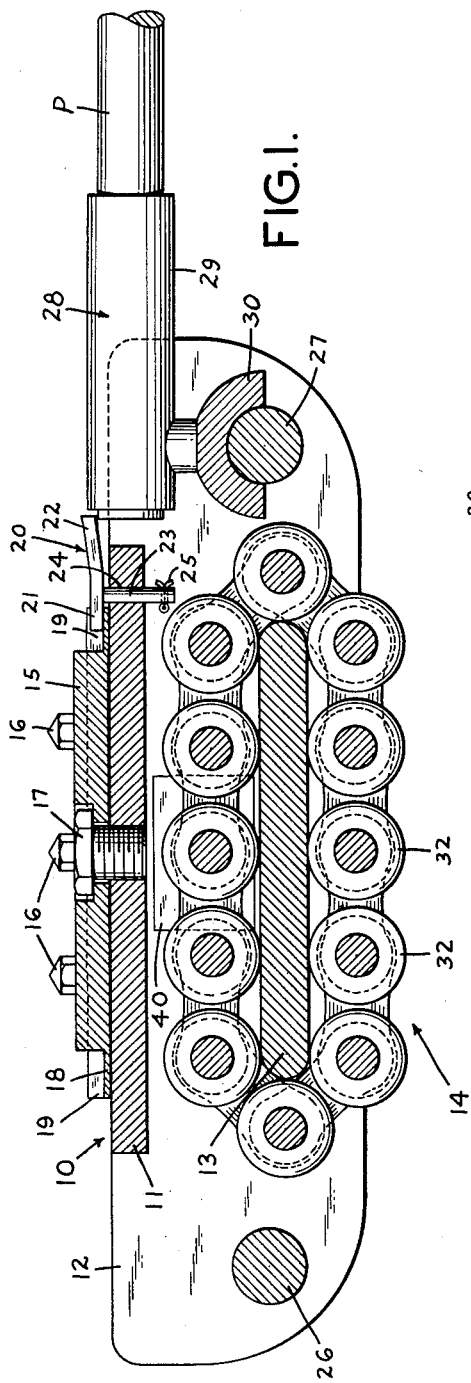
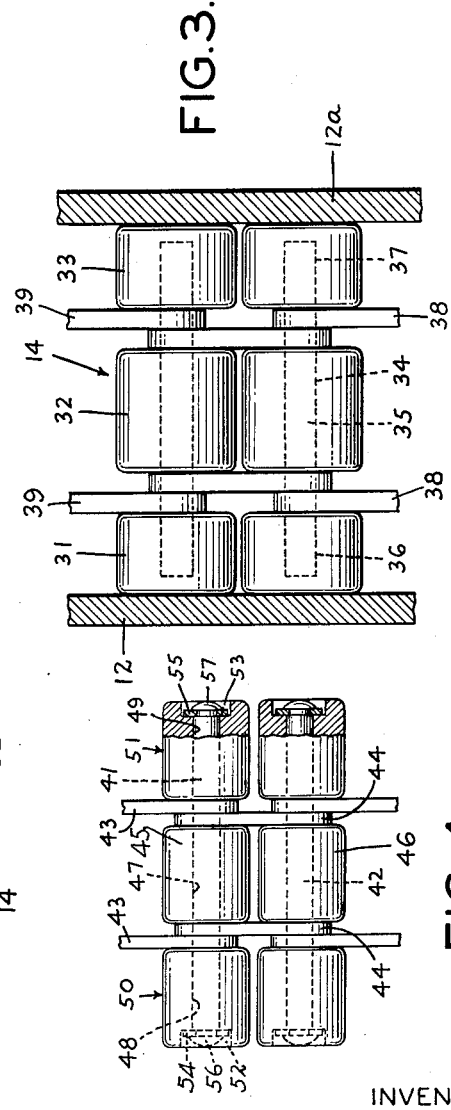
INVENTOR
SAMUEL RAPHAEL JOHN STOKVIS
BY
*Brumbaugh, Free, Graves & Donohue*
HIS ATTORNEYS

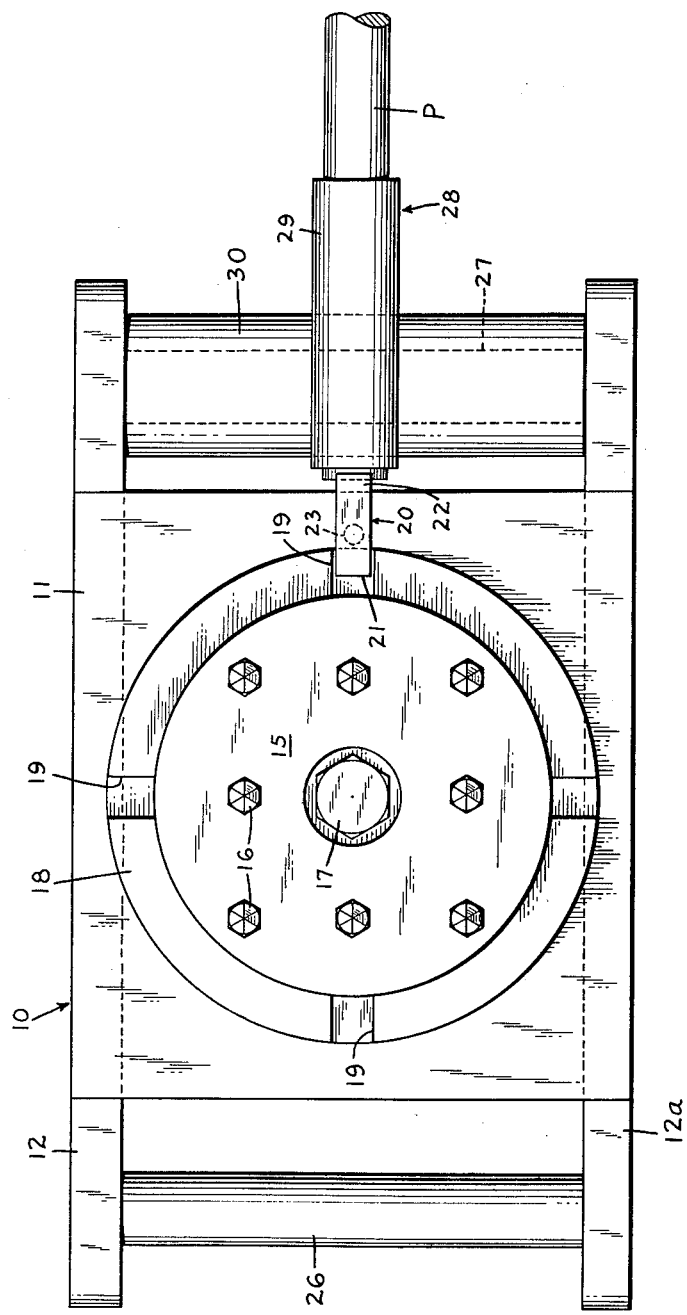

United States Patent Office 3,029,086
Patented Apr. 10, 1962

3,029,086
DOLLY
Samuel R. John Stokvis, Great Neck, N.Y. (% Stokvis Multiton Corporation, P.O. Box 249, Port Washington, N.Y.)
Filed June 25, 1959, Ser. No. 822,913
3 Claims. (Cl. 280—28.5)

This invention relates to improvements in dollies for moving furniture, heavy equipment, such as machinery and the like, and it relates particularly to improvements in heavy duty dollies having self-laying tracks.

Dollies have been provided heretofore which include a frame provided either with a fixed load-carrying platform or a turntable type of platform which enables the frame to be turned relative to the load carried thereby. In the self-laying track type of dolly, the frame has a centerpiece plate around which an endless roller chain passes, the rollers engaging the under surface of the centerpiece plate and the surface over which the dolly is to be moved in order to distribute the weight and permit relatively easy movement of the dolly and the load carried thereby over the surface.

The prior dollies have certain practical disadvantages. Those dollies which have a fixed, load supporting platform are not readily turned in order to enable the load carried thereby to change direction, hence they are effective primarily for straight line movement.

Those dollies which have a rotary or turnable type of load-supporting platform thereon can be adjusted to change the direction of movement of the dolly and the load supported thereon but they are less effective for straight line movement for the reason that they tend to be deflected by irregularities in the supporting surfaces and for other reasons, thereby requiring frequent adjustment to enable the load to be moved along a given path.

The types of roller chains used heretofore in dollies are also open to some disadvantages. Usually these roller chains consist of a plurality of rollers mounted on shafts which extend lengthwise through the rollers and are connected in parallel relation by means of links mounted at opposite ends of the rollers. The shafts are provided with peened or swaged heads to retain the links and the rollers thereon and these heads bear against and are guided by the side pieces or side plates of the dolly frame. Due to the fact that the dollies are used for transporting heavy loads, the rollers frequently are subjected to endwise thrust which forces the headed shafts against the side plates of the dolly frame. As a consequence, the heads of the roller shafts wear away and the roller chain breaks. It has been proposed heretofore to harden the heads of the shafts but this is not very practical because it is difficult, if not impossible, to harden the heads of the shafts after the chains are assembled in the dollies and, moreover, the hardened heads increase the wear on the side pieces of the frame, eventually weakening them to the extent that the dolly is rendered useless.

In accordance with the present invention dollies are provided which do not have the defects of the prior dollies pointed out above.

More particularly, in accordance with the present invention, a dolly is provided which has a rotary type of load-supporting surface or platform which can be releasably retained against rotation relative to the dolly when the dolly is used to transport articles in a straight line. The releasable retaining means is constructed and arranged so that the bar normally used to turn or change the direction of the dolly can be used to release the retaining means to enable the platform to rotate relative to the frame.

Another feature of the invention is the provision of a new type of roller chain, each link of which includes a row of rollers in end to end relation instead of a single roller, the new rollers being arranged so that they receive and protect the ends of the connecting shaft thereby diverting wear from the shafts to the end rollers of the rows.

More particularly, a typical roller chain embodying the invention is made up of a series of rows of rollers including two end rollers each of which is provided with a socket or recess in which the ends of a connecting shaft are received thereby affording protection to the ends of the shaft. Between the end rollers are mounted one or more intermediate rollers provided with central holes through which the shaft passes. The links which connect the rows of rollers and the shafts together are interposed between the end rollers and the intermediate rollers adjacent thereto so that these links are maintained out of contact with the side pieces of the dolly frame and their life is thereby greatly prolonged. Inasmuch as the end rollers may be suitably hardened, and have rolling contact with the side walls, as well as extensive end area, wear on the ends of the rollers and on the side pieces of the frame is reduced to a minimum so that frequent repair or replacement of the roller chain is unnecessary.

For a better understanding of the present invention reference may be had to the accompanying drawing in which:

FIGURE 1 is a view in longitudinal section through a dolly of the type embodying the present invention;

FIGURE 2 is a plan view of the dolly showing the arrangement of the load-supporting platform and latch therefor;

FIGURE 3 is a plan view of a section of one form of roller chain for the dolly; and FIGURE 4 is a plan view of a section of a modified form of chain for the dolly.

The frame 10 of the dolly shown in the drawing is generally of conventional construction including a top plate 11, a pair of side pieces or side plates 12, 12a and a centerpiece plate 13 around which is passed a roller chain 14 which is adapted to roll along a surface and to support the weight carried by the dolly through the medium of the centerpiece plate 13.

In accordance with the invention, the dolly frame is provided with a rotary platform 15 of disk-like form which has upwardly extending spikes 16 thereon to engage the load or a pallet or the like on which the load is supported. The rotary platform is held in place by means of a bolt or screw 17 which is threaded into the top plate 11 enabling the platform 15 to rotate. If desired, anti-friction bearings such as ball bearings may be interposed between the platform 15 and the top plate 11.

As shown in FIGURES 1 and 2, the platform 15 has a peripheral flange 18 which is provided with a series of notches 19 therein to receive a latch member 20 having a short nose or end portion 21 thereon adapted to engage in any of the notches 19 and a longer outwardly extending arm 22. The latch member 20 is guided for up and down movement by means of a shaft 23 which is slidably received in a hole 24 in the top plate 11 and may be detachably retained in the top plate by means of a cotter pin 25.

In opposite ends of and spanning the space between the side plates 12, 12a are rods or shafts 26 and 27 which are adapted to be engaged by means of a manipulating bar 28 to enable the dolly to be rotated relative to the load supported by the platform 15. The bar includes a sleeve-like socket 29 for receiving the end of a crowbar or a piece of pipe P to provide a long lever arm.

Extending downwardly from the socket 29 is an arcuate or semi-cylindrical member 30 of about the same width as the length of the rods 26 and 27 and adapted to rest on top of either of them and engage the side pieces 12 at its opposite ends. In this way, by dropping the member 30 on top of the rod 27 the bar 28 is connected to the dolly frame and leverage can be applied for turning the entire dolly relative to the platform 15 and the load supported by it to change its direction.

The pipe or crowbar can be pushed through the socket 29 so that it extends beneath the longer arm 22 of latch 21 and until its extremity abuts against the edge of top plate 11. In so doing the crowbar's extremity will make contact with the longer arm 22 of latch 20 and force it upwards, thus releasing the short arm 21 of latch 20 from a notch 19.

The bar 28 is used to turn the frame 10 of the dolly and its roller chain 14 relative to the rotary platform 15 and its load.

When pipe P is retracted without entirely removing it from socket 29 and the frame is turned, the short arm 21 of latch 20 rides on the surface of peripheral flange 18 of platform 15 until it drops of its own weight into another notch.

It will be understood that if pipe P is not retracted it will continue to exert upward pressure on short arm 21 of latch 20 and continued clockwise motion of bar 28 will permit short arm 21 of latch 20 to bypass notches in peripheral flange 18 of platform 15 thus allowing the dolly to be used as a rotary type dolly rather than as a combined fixed and rotary dolly. It will be further understood, of course, that latch 20 can be removed completely if the dolly is to be used exclusively as a rotary type dolly rather than as a fixed and rotary dolly. Moreover, the angular spacing of the notches 19 can be varied as desired so that small angular changes in direction are possible rather than the 90° change of direction afforded by the notches shown in FIGURE 2.

FIGURE 3 illustrates a novel type of dolly chain 14. As shown in FIGURE 3, each roller assembly of the chain is composed of at least three roller sections 31, 32 and 33. The intermediate roller 32 is provided with a through bore 34 for receiving a shaft 35. The end rollers 31 and 33 have recesses 36 and 37 therein which do not extend completely through the rollers from end to end. The ends of the shaft 35 are received in the recesses 36 and 37 and thus are protected against wear and damage by contact with the side pieces 12 of the dolly frame. Each roller assembly is connected by means of pairs of links 38 and 39 to adjacent roller assemblies of the chain. By disposing the links 38, 39 etc. between the intermediate rollers and the end rollers, the links are protected against damage and their operating life is greatly prolonged.

It will be understood that with some forms of dollies, more than one intermediate roller 32 may be provided. The rollers may be assembled to form an endless chain which is assembled around the centerpiece plate 13 prior to assembly of the centerpiece with the frame. To enable such assembly the side pieces of the frame may be provided with internal grooves (not shown) extending inwardly from one end thereof so that the centerpiece with the chain assembled thereon can be slipped endwise into the grooves and secured in position. Alternatively and as illustrated in FIGURE 1, the side pieces 12, 12a may be provided with removable sections 40 enabling the ends of the chain to be joined after it has been wrapped around the centerpiece plate.

FIGURE 4 shows a modified type of chain in which the ends of the shafts are disposed in recesses in the rollers and protected thereby. The chain is made up of a plurality of shafts 41, 42, connected by means of pairs of links 43, 43 and 44, 44 symmetrically disposed on opposite sides of the intermediate rollers 45, 46 of the roller sets. Shaft 41, for example, passes through a central opening 47 in the roller 45 and also has its opposite ends extending through bores or openings 48 and 49 in the end rollers 50 and 51. Each of the rollers 50 and 51 has a recess 52 or 53 in its outer end in which is received a washer 54 and 55 against which the ends of the shafts are swaged or peened to form heads 56 and 57 which retain the washers on the ends of the shaft and also secure the rollers 45, 50 and 51 on the shaft 41. The recessed rollers afford protection to the ends of the shaft 41 so that the heads 56 and 57 thereon need not be hardened. In fact, the heads 56 and 57 are further protected against frictional engagement with the end rollers 50 and 51 by means of the washers 54 and 55 which are in sliding engagement with te rollers and thus absorb the wear which occurs during operation of the dolly.

If desired, the rollers 50 and 51 and the washers 54 and 55 can be hardened to prolong their operating life.

The ends of this chain are connected in a manner similar to the chain described above or the ends can be connected by inserting a shaft like the shaft 41 through the links and rollers and then peening over one or both ends of the shaft. Such an operation can be accomplished through the cutouts as described above or by arranging the dolly frame so that the end of a shaft 41 or 42 is exposed for access thereto. Roller chains of the type described have numerous advantages. Inasmuch as the end and intermediate rollers rotate independently, it is much easier to change the direction of movement of the dolly along a surface. Wear on the chain is very substantially reduced due to the fact that the ends of the rollers are relatively flat and endwise thrust urging the rollers against the side pieces of the dolly frame is distributed over relatively wide surfaces so that wear is materially reduced. Moreover, the end rollers can be appropriately hardened prior to assembly so that their resistance to wear is materially improved.

It will be understood that dollies of various sizes, shapes and arrangements can be made without departing from the invention and that the dolly described herein should be considered as illustrative.

I claim:

1. A heavy duty dolly comprising a frame having side pieces, a centerpiece plate extending between and connecting said side pieces and a load-carrying platform supported on and for rotation relative to said side pieces above and in spaced relation to said plate, a roller chain extending around said plate in rolling relation thereto and to a supporting surface over which said dolly is adapted to move, said chain including a plurality of shafts, pairs of links extending lengthwise of said side pieces and connecting said shafts in parallel relation, at least one roller rotatably mounted on each shaft between said pairs of links and end rollers having recesses in their ends receiving the ends of said shafts outwardly of said links, said end rollers having their outer ends disposed outwardly of the ends of said shafts and adjacent to said side pieces, latching means on said frame and platform for releasably retaining said platform against rotation, a bar for engaging and turning said frame, and cooperating elements on said bar and said latching means for releasing said latching means by rocking said bar relative to said frame.

2. A heavy duty dolly comprising a frame having side pieces, a center piece plate extending between and connecting said side pieces, a load-carrying platform supported on and for rotation relative to said frame above and in spaced relation to said plate, a roller chain extending around said plate in rolling relation thereto and to a supporting surface over which said dolly is adapted to move, latching means on said frame and platform for releasably retaining said platform against rotation, a cross bar extending between said side pieces, a member including a rod engageable with said cross bar for rotating said frame and said platform relatively, said rod being movable endwise into engagement with said latching means for releasing it to permit relative rotation of said frame and said platform.

3. A heavy duty dolly frame comprising a frame having side pieces, a center piece plate extending between and connecting said side pieces, a load-carrying platform supported on said frame above and in spaced relation to said plate, an endless roller chain extending around said plate in rolling relation thereto and to a supporting surface over which said dolly is adapted to move, said chain including a plurality of shafts, pairs of links extending lengthwise between said side pieces and connecting said shafts in parallel relation, at least one roller rotatably mounted on each shaft between said pairs of links, end rollers having recesses therein receiving the ends of each shaft outwardly of said links, and means for maintaining the outer ends of said shaft inwardly of the outer ends of said end rollers and out of contact with said side pieces.

References Cited in the file of this patent

UNITED STATES PATENTS

| | | |
|---|---|---|
| 385,251 | Daniels | June 26, 1888 |
| 1,808,898 | Kerr | June 9, 1931 |
| 2,337,670 | LeTourneau | Dec. 28, 1943 |
| 2,644,691 | Pohle | July 7, 1953 |
| 2,744,758 | Stokvis et al. | May 8, 1956 |

FOREIGN PATENTS

| | | |
|---|---|---|
| 23,557 | Great Britain | Oct. 28, 1902 |
| 411,836 | Great Britain | June 8, 1944 |
| 476,586 | Italy | May 10, 1951 |